United States Patent [19]
Kelly, Jr. et al.

[11] 3,869,296
[45] Mar. 4, 1975

[54] AQUEOUS STARCH-PIGMENT PAPER COATING COMPOSITIONS CONTAINING GLYOXAL-UREA INSOLUBILIZER

[75] Inventors: George Bernard Kelly, Jr., Gaithersburg, Md.; Robert Howard Lowery, Alum Creek, W. Va.

[73] Assignee: Union Carbide Corporation, New York, N.Y.

[22] Filed: June 20, 1973

[21] Appl. No.: 371,606

Related U.S. Application Data

[63] Continuation-in-part of Ser. No. 239,331, March 29, 1972, abandoned.

[52] U.S. Cl. ............... 106/214, 117/156, 260/17.3
[51] Int. Cl. ..................... C08b 25/02, C08b 27/02
[58] Field of Search .......... 106/214, 213; 260/17.3; 117/156

[56] References Cited
UNITED STATES PATENTS

| | | | |
|---|---|---|---|
| 2,302,303 | 11/1972 | Glarum | 106/213 |
| 2,978,359 | 4/1961 | Wedell | 260/17.3 S |
| 3,293,057 | 12/1966 | Rumberger | 106/213 |
| 3,549,568 | 12/1970 | Coscia | 260/17.3 |

*Primary Examiner*—Theodore Morris
*Attorney, Agent, or Firm*—Francis M. Fazio

[57] ABSTRACT

Paper coating compositions are provided containing a pigment, starch as binder for the pigment and a latent water insolubilizing agent for the binder. Exemplary of these compositions is a fluid dispersion of clay in aqueous medium containing starch as pigment binder and from about 2 to 10 percent based on the weight of the starch of a latent insolubilizer for the starch. Said latent insolubilizer being the reaction product of urea and glyoxal at a mole ratio of from about 0.5 to about 0.75 mole of urea to 1.0 mole of glyoxal. These compositions cure at low temperatures, are stable, and provide coatings which possess high wet-rub resistance.

5 Claims, No Drawings

3,869,296

AQUEOUS STARCH-PIGMENT PAPER COATING COMPOSITIONS CONTAINING GLYOXAL-UREA INSOLUBILIZER

This application is a continuation-in-part of Ser. No. 239,331, filed Mar. 29, 1972 now abandoned.

This invention relates to paper coating compositions. More particularly it relates to paper coating compositions which are stable and show no appreciable change in viscosity on storage and are convenient to use in conventional equipment.

Paper coating compositions are generally a fluid suspension of pigment, such as clay or the like, in an aqueous medium which includes an adhesive, such as starch, which serves to bind the pigment to the paper.

Because of its low cost and good working qualities, starch is the most prominent adhesive used for binding paper pigment coatings compositions. High-solids coating colors with relatively low viscosities can be prepared readily for machine coating. However, starch lacks good water resistance. This hinders its use in such applications as coated offset papers and coated paperboards which are water finished on the machine.

A number of procedures and products are available for imparting wet rub resistance to starch-clay coatings. In general, water resistance is obtained either by adding water-resistant materials to the starch coating color or by adding to the coating color a material that reacts or combines with the starch. The addition of latexes and wax emulsions is typical of the first method, while use of metallic salts, aldehydes, and aldehyde resins (melamine-formaldehyde, urea-formaldehyde) is typical of the second.

While these methods have met with some success, they have not been entirely adequate. Thus, the use of formaldehyde results in obnoxious fumes, and even formaldehyde resins give a characteristic odor. In many cases, adequate wet-rub resistance has not been obtained. Perhaps the biggest drawback to these materials has been the slowness with which they develop wet rub resistance. Several days or weeks are usually required to develop maximum wet rub resistance. This is a particular disadvantage where the coating is water-finished at the calender stack.

The use of glyoxal as an insolubilizer for starch has not been widely accepted for two important reasons, the first being the color frequently imparted to paper by the commercial grades of glyoxal. However, modern manufacturing techniques now make available glyoxal which is essentially free of color-forming materials and other impurities thereby eliminating this objection. The other reason glyoxal, although an excellent insolubilizer for starch, has not received wide acceptance by the art is because of the significant increases in viscosities of paper coating compositions experienced when glyoxal is utilized in the paper coating formulation. In many cases this increase in viscosity is immediate and is so great that the application of the coating or adhesive becomes very difficult or even impossible because of limitations of the coating application machinery and in the application of a coating of uniform weight or thickness during the production run. Frequently glyoxal-insolubilized coatings suffer complete gelation, particularly in high solids formulations, and this sometimes happens even in moderate or low solids formulations if they are not used immediately. This viscosity increase is a serious limitation on the use of glyoxal, as it is not always possible to schedule the production of batches of coating or adhesive so that no delay is encountered. The usual practice is to prepare the coating batches, which may then be held for up to 24 hours before use, depending upon the mill schedule, so that delays in the running of the coating machines will not occur while waiting for another batch of coating to be prepared.

It is therefore highly desirable to utilize a coating composition containing glyoxal as an insolubilizer for starch, which coating composition can be prepared and held for up to 24 hours or even longer with little or no change in viscosity or coating characteristics.

Accordingly, an object of the present invention is to provide new and improved paper coating compositions which are stable on storage, convenient to apply, and which produce a coating on paper having good wet-rub resistance containing a pre-formed reaction product of urea and glyoxal as a latent water insolubilizing agent for the starch.

Another object of this invention is to provide novel paper coating compositions containing a pigment, a starch as binder for the pigment and a latent water insolubilizing agent for the starch binder which converts the starch to a water-resistant state when paper coated with the composition is heated briefly under paper drying conditions.

Still another object of this invention is to provide novel paper coating compositions which are conveniently and easily applied to paper.

Additional objects and advantages will be set forth in part of the description which follows and in part will be obvious from the description or may be learned by practice of the invention, the object and advantages being realized and attained by means of the compositions, products and improvements, particularly pointed out in the appended claims.

To achieve the foregoing objects and in accordance with its purpose, this invention, as embodied and broadly described, provides a paper coating composition comprising a paper-coating pigment, a starch as binder for the pigment, and from about 2 to 10 percent by weight, based on the weight of the starch, preferably about 3 to 7 percent, of a latent water insolubilizer for the starch comprising the product produced by reacting urea and glyoxal at a molar ratio of from about 0.5 to about 0.75 mole of urea to 1.0 mole of glyoxal, preferably at a molar ratio of 0.5 to 0.6 mole of urea per mole of glyoxal.

It was indeed surprising to discover that the preformed urea-glyoxal reaction product, as described herein, greatly reduces or substantially eliminates the enormous increase in viscosity that occurs when glyoxal alone is employed as an insolubilizer for starch without destroying the effectiveness of the glyoxal. Although urea has been used as a fluidizer and viscosity reducer with starch binders in coating colors for a number of years, its use has been regarded previously by those skilled in the art as incompatible with glyoxal. In fact, published literature specifically advises against the use of urea with glyoxal because the urea reacts with the glyoxal and destroys its effectiveness as an insolubilizer. This is true where the urea is employed in the normal dosages (10–20 percent of the weight of the binder) for viscosity reduction with starch. In such dosages the urea is present in a mole ratio to glyoxal of greater than 1:1 and the reaction product obtained at these high molar ratios is inactive as far as insolubilization of starch is concerned.

However, we found that when the amount of urea employed is reduced to 0.5 to 0.75 mole of urea per mole of glyoxal, that the reaction product is effective as a latent water insolubilizer for starch binders for paper coating compositions and, advantageously, the viscosity is not seriously increased.

The reaction product of urea and glyoxal can be easily prepared by mixing the proper weight of urea with the glyoxal solution. The glyoxal may be of high chemical purity, but such is not needed. Generally the commercially available aqueous solutions having glyoxal contents of from about 20 to 40 weight per cent are used.

The order of mixing the reactants is not critical and thus the urea can be added to the glyoxal or the reverse sequence can be followed—that is, adding the glyoxal to the urea. The temperatures employed are likewise not critical and can be varied over a wide range such as from about 10°C. to about 100°C. with faster reaction being obtained by employing temperatures within the upper range. Merely as illustrative, the reaction is complete after about 1 to 2 hours at 60°C. to 80°C. or after 24 hours at room temperature. Generally, the urea dissolves rapidly in the glyoxal accompanied by a drop in temperature, and if desired, the dissolution rate can be speeded up by mild warming. Agitation is desirable to speed up the dissolution and assure a homogeneous solution of the reaction product. In general, the course of the reaction can be followed by analysis of the mixture for glyoxal using the analytical method for glyoxal, in which a weighed sample of the product is treated with a measured excess of standardized sodium hydroxide solution (usually 1N), mixed well and the excess sodium hydroxide back titrated with standardized acid solution (usually 0.5 N $H_2SO_4$). A blank titration is made and the difference between the blank and the sample titration represents the glyoxal present. The basis of the method is the internal Cannizzaro rearrangement of glyoxal in the presence of strong alkali to form glyolic acid, which neutralizes an equivalent quantity of the standardized sodium hydroxide. Thus:

(ml Blank titration-ml sample titration × normality of acid × 0.58)/wt. sample = glyoxal present.

The structure of the reaction product can not be set out with any degree of certainty since complex mechanisms are involved. According to information available, the reaction product is a mixture.

The pre-formed reaction product of from 0.5 to 0.75 mole of urea per mole of glyoxal is a mixture of components that contains a small amount of unreacted glyoxal, a small amount of 4,5-dihydroxyl-2-imidazolidone (less than 15 percent) with the bulk of the reaction product being a mixture of low molecular weight polymeric molecules, as determined by gel permeation chromatography. This has been substantiated by infrared analysis curves and nuclear magnetic resonance spectra. The average molecular weight of the reaction product will vary from about 250 to about 325.

Gel permeation chromatography showed that at a 0.3:1 ratio an appreciable amount of unreacted glyoxal was present and there was only slight evidence of oligomer or polymer. No sign of the presence of 4,5-dihydroxyl-2-imidazolidone was noted. At a 0.55:1 ratio there was just a trace of unreacted glyoxal, less than 5 percent by area of 4,5-dihydroxyl-2-imidazolidone (DHI) and the balance was low molecular weight polymeric species. Similar results were observed for the 0.7:1 mole ratio product as for the 0.55:1 mole ratio product. At a mole ratio of 1:1 gel permeation chromatography showed that essentially the sole product present was 4,5-dihydroxyl-2-imidazolidone; there was no evidence of unreacted glyoxal and a mere trace of poolmeric material; the overage molecular weight of this reaction product was 131. At a mole ratio of 0.9:1 the gel permeation chromatography curve was similar to that obtained when the mole ratio was 0.7:1. However the reaction product was not as effective in a pigmented paper coating composition containing starch as the binder in yielding good immediate water resistance as measured by wet rub resistance. This is summarized in the following table:

| Mole ratio urea:glyoxal | Polymeric Constituent Present | Glyoxal Present | DHI Present |
|---|---|---|---|
| 0.3:1 | trace | balance | 5 |
| 0.55:1 | balance | trace | 7 |
| 0.7:1 | balance | trace | 12 |
| 1:1 | trace | none | ~100 |

Gel permeation chromatography is determined according to the procedure described by J. C. Moore, J. G. Hendrickson in the Journal of Polymer Science, Part C 8 (1965) 233–241.

The data above was obtained using a duPont Model 820 Liquid chromatography having a column 1 meter long by 0.5 mm inside diameter packed with gel particles 25 to 100 microns in size of Sephadex LH–20 (Registered Trademark), a hydroxpropylated dextran-gel. Sample weight was 0.2 mg. Water was used as the eluent at a rate of 0.206 ml. per minute. The temperature was kept at 26°C. The detector used was a differential refractometer to measure change in refraction of the material as it is eluted from the column and this was plotted against the time required for the material to elute. Normally, a test requires about 1.5 hours under these conditions.

The average molecular weight was obtained by conventional osmometric analytical methods.

Thus, although the structure or structures of the reaction products cannot be defined with a definite degree of reasonableness, we have found, as stated previously, that the mixture of reaction products, whatever they may be, produced by reacting 0.5 to 0.75 mole of urea per mole of glyoxal is extremely suitable for imparting good, immediate wet-rub resistance to coatings and in controlling the viscosity of the pigmented paper coating formulation.

The compositions of this invention can contain any of the materials which have heretofore been present in paper coating compositions. They may contain suitable pigment material that can be readily dispersed in an aqueous medium to provide a pigment slip for coating paper. Suitable white pigments in common use for paper coating purposes include clay, titanium dioxide, calcium carbonate, and the like. Lubricants, latexes, dyes, perfumes, colored pigments (for example, ultramarine blue and carbon black) and bacteriocides may also be present.

The starch binders present in the compositions of this invention are those which are commonly used for the purpose. They include unmodified starch, oxidized starch, enzyme-converted starches and modified starches containing functional groups such as hydroxyl, carbonyl, amido and amino groups. Converted starches are generally preferred because of their good binding power and lower viscosity. The term "starch," therefore, as used throughout this specification and claims is intended to include any member of the family of starches, or mixture of two or more starches, which is commonly used as a pigment adhesive.

In the compositions of the present invention the quantity of starch binder is based upon the amount of the pigment present. In general, sufficient starch is used to provide firm bonding of the pigment to the paper when the paper is dry. This varies with the precise amount of bonding desired in each instance and with the specific adhesive characteristics of the particular starch used; generally, the amount of starch employed is between 10 percent and 25 percent based on the weight of the pigment.

The amount of latent water insolubilizer present, i.e., the amount of urea-glyoxal reaction product, is based on the amount of starch present, on the specific insolubilizing capabilities of the reaction product present in each instance, and on the ultimate amount of insolubilization desired. As a rule of thumb, it is generally convenient to employ from about 2 percent to about 10 percent of the insolubilizer based on the dry weight of the starch, preferably about 3 to 7. Suitable amounts of starch and latent water insolubilizer are readily found by trial.

The total solids content of the composition in any instance depends upon the method by which the composition is to be applied to the paper, and ranges from about 40 percent to about 70 percent so as to provide a coating of convenient viscosity.

The glyoxal-urea reaction product is mixed with an aqueous dispersion of the pigment and starch in such proportions that the resulting coating composition contains from about 2 to 10 percent of the starch insolubilizing agent based on the weight of the starch.

In a preferred embodiment of this invention a paper coating composition is provided that comprises clay, 15 percent starch based on the weight of the clay, and 10 percent of the reaction product mixture of glyoxal and urea based on the weight of the starch. The reaction product preferably is prepared from 0.5 to 0.6 mole of glyoxal per mole of urea. Within the range, there is obtained the best combination of good immediate wet-rub resistance and good control of viscosities.

The compositions of this invention can be coated on paper by any commercial method known to the art. Advantageously, however, the coating compositions need not be applied immediately after formulation as is customary in the case of glyoxal to avoid increases in viscosity of the formulation. The coating compositions are stable and can be stored for several days prior to application. The applied coating composition is dried and cured at temperatures of about 200°F. to 300°F. for about 1 to 10 minutes.

The paper and paper-like products of the present invention are water-laid cellulosic webs carrying the above-described compositions in heat-cured state.

To illustrate the invention more specifically, reference is made to the following specific examples. These examples illustrate the preparation of the paper coating compositions of this invention and their stability over periods of time.

The following formulation is referred to in the examples and for purposes of easy referral and simplicity is set out as follows:

| Dry (parts) | Formulation A |
|---|---|
| 100 | No. 2 coating clay (HT Predispersed - Englehard Min. & Chem. Co.) 70% (total solids) |
| 20 | Starch, hydroxyethylated, low visc., (Penford Gum 290, Penick & Ford) 25% (total solids) |
| As indicated | Insolubilizer |
| water | to make 54% total solids |
| pH | 6.8 – 7.5 |

The formulation was prepared as follows:

The pigment was first dispersed in water under high shear at 70 percent total solids. An aqueous dispersion of starch was prepared by heating starch in water with agitation at 95° – 98°C. for 15 minutes. The cooled starch adhesive was then added to the pigment dispersion with mild agitation, and water to make the desired total solids. The insolubilizer was added as the final ingredient.

In order to characterize the wet-rub resistance of the papers coated in accordance with this invention, a modification of the Technical Association of the Pulp and Paper Industry routine control method of RC–184 was used. This routine control method employs a machine known as the Tabor Abraser. This machine has a horizontal rotating table to which a sample may be clamped and a counting mechanism to record the number of rotations of the table. Above the table there is a weighted pivoted arm on which a rubbing element may be mounted so that it bears against the sample on the sample table during rotation. The pressure exerted by the rubbing element is adjustable by means of counterweights hung from the arm. The routine control method described in the Technical Association issuance employs a brush as the rubbing element. In the test performed for this invention, a one-inch brush with a 50 gram weight against the surface of the coated paper sample was employed. To determine the wet-rub resistance of a sample, the brush was saturated with water and the sample was wetted with 10 ml. of water before the test. After fifty (50) cycles, the pigment picked up by the brush is carefully washed into a predetermined volume of distilled water, and the pigment suspended in the volume of distilled water is determined by means of a turbidimeter using distilled water as a standard. Before use, the apparatus is carefully calibrated so that the turbidity measurement represents the amount of pigment removed in the particular number of cycles used in the test.

The viscosities were measured using a Brookfield Synco-Lectric Viscometer, Model RVT on formulated coatings which had aged 1 hour at 50°C.

The following examples are illustrative and are not to be construed as limiting the scope and underlying principles of the invention in any way. All parts and percentages referred to herein are by weight unless otherwise indicated.

EXAMPLE I

Thirty-three grams of urea (0.55 moles) were dissolved in 145 grams of 40 percent aqueous glyoxal solution (1.0 moles), with agitation, at room temperature for 7 hours to yield a reaction product that was a mixture of low molecular weight polymers containing a trace amount of unreacted glyoxal and a small amount of 4,5-dihydroxyl-2-imidazolidone. Aldehyde group content, calculated as glyoxal was 14.1 percent. After standing for 24 hours the reaction product was evaluated in Formulation A and compared with glyoxal alone as insolubilizer. The results are shown in the table below.

This example shows the overall effectiveness of the 0.55 mole urea to 1.0 mole glyoxal reaction product. As shown by the data, the reaction product of this invention produced a paper coating composition that had lower initial viscosity than was obtained using glyoxal alone; further, it did not gel on standing. When compared to the coating composition free of either additive it exhibited markedly superior wet-rub resistance properties. While the composition prepared using glyoxal alone also showed good wet-rub resistance, it is to be noted that this composition could not be used after standing for 72 hours, as it gelled. The composition containing the reaction product of this invention could still be used after standing for 72 hours or more.

|  | Insolubilizer | | |
| --- | --- | --- | --- |
|  | Urea:Glyoxal 0.55:1 | Glyoxal, control | None, control |
| % Based on Starch | 10 | 5 | 0 |
| Brookfield Visc., cps. | | | |
| After 1 hour | | | |
| 10 RPM | 5,360 | 13,560 | 3,820 |
| 100 RPM | 1,246 | 2,696 | 952 |
| After 72 hours | | | |
| 10 RPM | 10,360 | Gelled | 5,340 |
| 100 RPM | 1,812 | Gelled | 1,194 |
| Wet Rub Resistance | | | |
| Drum Dried | 71 | 91 | 8 |
| Fully Cured | 95 | 96 | 7 |

For further comparison the reaction product of this invention was compared to the products described in Example 22 of U.S. Pat. No. 3,293,057. This is reported as Example II.

EXAMPLE II

Following the procedure described in Example I, 0.55 mole of urea was reacted per mole of glyoxal to produce a 50 percent aqueous solution of the reaction products of the urea and glyoxal.

A starch composition was prepared by cooking a mixture of 9.5 parts of the above aqueous solution, 520 parts of water and 60 parts of corn pearl starch in a high shear mill to a temperature of 180°F. This was a clear, pourable composition and contained 3.1 parts dry glyoxal.

A 70 percent clay dispersion in water was prepared by stirring until uniform.

A coating composition was produced using 394 parts of the starch composition and 286 parts of the clay dispersion by stirring at ambient room temperature until uniform. This coating composition had a pH of 6.1 and contained 20 parts of starch per 100 parts of pigment (Coating Composition 2).

The Brookfield viscosities at 50°C., using a No. 5 spindle, were as follows:

| at 10 rpm | 12,160 cps |
| 20 rpm | 7,040 cps |
| 50 rpm | 3,540 cps |
| 100 rpm | 2,180 cps |

Comparative Experiment

Following the procedure described in U.S. Pat. No. 3,293,057 (see Example 22) 520 parts of water, 60 parts of corn pearl starch, 30 parts of urea and 7.7 parts of 40 percent aqueous glyoxal were cooked in a high shear mill to a temperature of 180°F. This starch composition was a non-pourable gel and contained 3.1 parts dry glyoxal.

A coating composition was produced using 412 parts of this starch composition and 286 parts of the same clay dispersion, as above. This coating composition had a pH of 6.3 and contained 20 parts of starch per 100 parts of pigment (Comparative Coating A).

The Brookfield viscosities at 50°C, after one hour and using a No. 5 spindle, were as follows:

| at 10 rpm | 12,800 cps |
| 20 rpm | 7,680 cps |
| 50 rpm | 4,180 cps |
| 100 rpm | 2,700 cps |

The coating compositions were applied to paper at 10 lb per ream and the coated papers were treated in two different manners. Treatment I was by drying on a steam heated drum for 30 seconds. Treatment II was by drying on a steam heated drum for 30 seconds and then curing at 110°F. for 10 minutes. In all instances the sheets were then super-calendered by two passes between the rolls at a pressure of 1000 pounds and a temperature of 150°F. The coated sheets were then conditioned for 4 hours at 72°F. and 50 percent relative humidity and then the wet rub resistance was determined. High transmission values are desired as they indicate low extraction of the pigmented coating from the paper.

|  | Treatment I | Treatment II |
| --- | --- | --- |
| Coating Composition 2 | 65 | 76 |
| Coating Composition A | 33 | 25 |

What is claimed is:

1. A paper coating composition of a pigment, starch and a latent water insolubilizer for said starch, said latent water insolubilizer being the reaction product of from 0.5 to 0.75 mole of urea per mole of glyoxal and having an average molecular weight of from 250 to 325, and being present in said composition at a concentration of from 2 to 10 percent by weight based on the weight of the starch.

2. A composition as claimed in claim 1, wherein the mole ratio is from 0.5 to 0.6 mole urea per mole of glyoxal.

3. A composition as claimed in claim 1, wherein said latent water insolubilizer is present at a concentration of from 3 to 7 percent by weight based on the weight of the starch.

4. A composition as claimed in claim 2, wherein said latent water insolubilizer is present at a concentration of from 3 to 7 percent by weight based on the weight of the starch.

5. A composition comprising a cellulosic substrate coated with the heat cured paper coating composition claimed in claim 1.

\* \* \* \* \*